United States Patent [12]
Hong et al.

(10) Patent No.: US 10,735,869 B2
(45) Date of Patent: Aug. 4, 2020

(54) TERMINAL, AND OPERATION METHOD FOR TERMINAL

(71) Applicant: Samsung Electronics Co., Ltd., Gyeonggi-do (KR)

(72) Inventors: Jun-seong Hong, Gyeonggi-do (KR); Jeong-wun Jee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 354 days.

(21) Appl. No.: 15/750,739

(22) PCT Filed: Aug. 3, 2016

(86) PCT No.: PCT/KR2016/008550
§ 371 (c)(1),
(2) Date: Feb. 6, 2018

(87) PCT Pub. No.: WO2017/023109
PCT Pub. Date: Sep. 9, 2017

(65) Prior Publication Data
US 2020/0120429 A1  Apr. 16, 2020

(30) Foreign Application Priority Data
Aug. 6, 2015 (KR) .................. 10-2015-0111209

(51) Int. Cl.
H04R 25/00 (2006.01)
H04R 3/04 (2006.01)
H04M 9/08 (2006.01)

(52) U.S. Cl.
CPC .......... *H04R 25/453* (2013.01); *H04M 9/082* (2013.01); *H04R 3/04* (2013.01); *H04R 2430/03* (2013.01)

(58) Field of Classification Search
CPC .... H04R 25/453; H04R 3/04; H04R 2430/03; H04M 9/082
(Continued)

(56) References Cited

U.S. PATENT DOCUMENTS 5,307,417 A * 4/1994 Takamura ................ H04R 3/02
381/83
7,133,529 B2  11/2006 Ura
(Continued)

FOREIGN PATENT DOCUMENTS

JP  4681163  5/2011
KR  10-0272130  11/2000
(Continued)

OTHER PUBLICATIONS

International Search Report dated Nov. 29, 2016 issued in counterpart application No. PCT/KR2016/008550, 14 pages.

*Primary Examiner* — Phylesha Dabney
(74) *Attorney, Agent, or Firm* — The Farrell Law Firm, P.C.

(57) ABSTRACT

An operation method of a terminal may include: executing a voice call service between the terminal and at least one terminal; determining at least one short-range terminal existing within a preset range from among the at least one terminal, based on location information of the terminal; detecting a howling frequency band in which howling occurs between the terminal and the at least one short-range terminal from among a plurality of frequency bands in which the voice call service is performed, based on information of the plurality of frequency bands; and removing the howling by adjusting a gain of the howling frequency band.

15 Claims, 9 Drawing Sheets

(58) Field of Classification Search
USPC .......................................................... 381/318
See application file for complete search history.

(56) References Cited

U.S. PATENT DOCUMENTS

| | | | |
|---|---|---|---|
| 8,630,426 B2 | 1/2014 | Svendsen | |
| 9,036,829 B2 | 5/2015 | Lee | |
| 2011/0182439 A1 | 7/2011 | Sakurada et al. | |
| 2014/0357323 A1* | 12/2014 | Ahgren | H04M 9/082 455/570 |
| 2014/0357325 A1* | 12/2014 | Ahgren | H04M 9/082 455/570 |
| 2015/0078566 A1* | 3/2015 | Kumar | G10L 21/0208 381/66 |
| 2016/0225385 A1* | 8/2016 | Hammarqvist | G10L 21/0208 |

FOREIGN PATENT DOCUMENTS

| | | |
|---|---|---|
| KR | 1020080060129 | 7/2008 |
| KR | 1020110100960 | 9/2011 |

* cited by examiner

TERMINAL, AND OPERATION METHOD FOR TERMINAL

PRIORITY

This application is a National Phase Entry of PCT International Application No. PCT/KR2016/008550, which was filed on Aug. 3, 2016, and claims priority to Korean Patent Application No. 10-2015-0111209, which was filed on Aug. 6, 2015, the contents of each of which are incorporated herein by reference.

TECHNICAL FIELD

The present disclosure relates to a terminal and an operation method of the terminal, and more particularly, to a terminal for suppressing howling between terminals during a call and an operation method of the terminal.

BACKGROUND ART

The Internet is evolving from a human-centered connection network through which humans create and consume information to an Internet of Things (IoT) network through which distributed elements, such as objects, exchange and process information. Internet of Everything (IoE) technology, which is a combination of IoT technology and big data processing technology through connection with a cloud server is also emerging. In order to implement the IoT, technology elements such as sensing technology, wired/wireless communication and network infrastructure, service interface technology, and security technology are required, and thus technology for inter-object connection, such as a sensor network, machine to machine (M2M) communication, or machine type communication (MTC), has recently been studied.

In an IoT environment, intelligent Internet technology (IT) services that collect and analyze data generated by connected objects and create new value in human life may be provided. IoT may be applied to fields such as a smart home, a smart building, a smart city, a smart car or a connected car, a smart grid, health care, a smart home appliance, and an advanced medical service through convergence and integration of existing IT technology and various industries.

With advancements in communication technology and terminals, a push-to-talk (PTT) service in which a multi-party call may be made and hundreds of people may participate is being popularized.

A PTT service is a radio service in which a mobile phone may be used like a walkie-talkie and many people may simultaneously listen to a user speaking on the mobile phone with a single button press. That is, in a PTT service, simple communication may be performed as soon as a button is pressed and a relatively fast communication service may be provided when compared to a latency time of a general mobile phone.

Also, a PPT service may be used on-site as well as for remote conferencing. In particular, a voice call is used for fast communication in a high-risk workplace where many people are working or in an emergency situation such as a disaster situation.

However, when users' terminals are located within a short range during a multi-party call, a howling path may be formed between the terminals thus generating an amplified roaring sound, and thereby making it impossible to make a voice call.

Accordingly, there is demand for a method of suppressing or removing howling between terminals within a short range during a voice call.

DETAILED DESCRIPTION OF THE INVENTION

Technical Problem

The call quality of a terminal may be improved by removing or suppressing howling occurring between terminals during a call.

Also, sound quality degradation and power consumption of a terminal may be minimized by removing howling.

Also, howling may be more efficiently removed when a distance between terminals is short.

Also, there is provided a computer-readable recording medium having embodied thereon a program for executing an operation method of a terminal in a computer. Technical problems to be solved by an embodiment of the present invention are not limited to the above-described technical problems and one of ordinary skill in the art will understand other technical problems from the following description.

Technical Solution

According to an aspect, there is provided an operation method of a terminal including: executing a voice call service between the terminal and at least one terminal; determining at least one short-range terminal existing within a preset range from among the at least one terminal, based on location information of the terminal; detecting a howling frequency band in which howling occurs between the terminal and the at least one short-range terminal from among a plurality of frequency bands in which the voice call service is performed, based on information of the plurality of frequency bands; and removing the howling by adjusting a gain of the howling frequency band.

Also, the information of the plurality of frequency bands may include at least one from among a peak value and an energy value of each of the plurality of frequency bands.

Also, the detecting of the howling frequency band in which the howling occurs between the terminal and the at least one short-range terminal from among the plurality of frequency bands in which the voice call service is performed, based on the information of the plurality of frequency bands may include: obtaining an energy change rate of each of the plurality of frequency bands based on input voice information of the at least one short-range terminal and output voice information of the terminal; and detecting the howling frequency band, based on the energy change rate of each of the plurality of frequency bands.

Also, the detecting of the howling frequency based, based on the energy change rate of each of the plurality of frequency bands may include, when an energy change rate of a predetermined frequency band from among the plurality of frequency bands exceeds a preset change rate, detecting the predetermined frequency band as the howling frequency band.

Also, the operation method may further include obtaining voice loop cycle information of the voice call service, wherein the detecting of the howling frequency band, based on the energy change rate of each of the plurality of frequency bands includes detecting a predetermined frequency band whose energy change rate is periodically changed according to the voice loop cycle information from among the plurality of frequency bands as the howling frequency band, based on the voice loop cycle information.

Also, the removing of the howling by adjusting the gain of the howling frequency band may include adjusting the gain of the howling frequency band, based on at least one from among the information of the plurality of frequency bands, voice loop cycle information of the voice call service, a distance between the terminal and the at least one short-range terminal, and a number of the at least one short-range terminal.

Also, the adjusting of the gain of the howling frequency band, based on the distance between the terminal and the at least one short-range terminal may include: determining a filter coefficient so that the gain of the howling frequency band decreases as the distance between the terminal and the at least one short-range terminal decreases; and determining the filter coefficient so that the gain of the howling frequency band increases as the distance between the terminal and the at least one short-range terminal increases.

Also, the operation method may further include sharing, with the at least one short-range terminal, at least one from among the information of the plurality of frequency bands, a distance between the terminal and the at least one short-range terminal, voice call delay time information of the voice call service, and volume information of the terminal.

Also, the voice call delay time information may be obtained based on a voice delay by the terminal and a network formed between the terminal and the at least one short-range terminal.

Also, the removing of the howling by adjusting the gain of the howling frequency band in which the howling occurs may be performed by a notch filter of the terminal.

According to another aspect, there is provided a terminal including: a controller configured to execute a voice call service between the terminal and at least one terminal, determine at least one short-range terminal existing within a preset range from among the at least one terminal, based on location information of the terminal, detect a howling frequency band in which howling occurs between the terminal and the at least one short-range terminal from among a plurality of frequency bands in which the voice call service is performed, based on information of the plurality of frequency bands, and remove the howling by adjusting a gain of the howling frequency band; and an output unit configured to output a voice from which the howling is removed.

Also, the information of the plurality of frequency bands may include at least one from among a peak value and an energy value of each of the plurality of frequency bands.

Also, the controller may be further configured to obtain an energy change rate of each of the plurality of frequency bands based on input voice information of the at least one short-range terminal and output voice information of the terminal, and detect the howling frequency band, based on the energy change rate of each of the plurality of frequency bands.

Also, the controller may be further configured to, when an energy change rate of a predetermined frequency band from among the plurality of frequency bands exceeds a preset change rate, detect the predetermined frequency band as the howling frequency band.

Also, the controller may be further configured to obtain voice loop cycle information of the voice call service, and detect a predetermined frequency band whose energy change rate is periodically changed according to the voice loop cycle information from among the plurality of frequency bands as the howling frequency band, based on the voice loop cycle information.

Also, the controller may be further configured to adjust the gain of the howling frequency band in which the howling occurs, based on at least one from among the information of the plurality of frequency bands, voice loop cycle information of the voice call service, a distance between the terminal and the at least one short-range terminal, and a number of the at least one short-range terminal.

Also, the controller may be further configured to determine a filter coefficient so that the gain of the howling frequency band decreases as the distance between the terminal and the at least one short-range terminal decreases, and determine the filter coefficient so that the gain of the howling frequency band increases as the distance between the terminal and the at least one short-range terminal increases.

Also, the terminal may further include a communicator configured to transmit to the at least one short-range terminal at least one from among the information of the plurality of frequency bands, the distance between the terminal and the at least one short-range terminal, voice call delay time information of the voice call service, and volume information of the terminal.

Also, the terminal may further include a notch filter, wherein the notch filter is configured to remove the howling by adjusting the gain of the howling frequency band in which the howling occurs.

According to another aspect, there is provided a computer-readable recording medium having embodied thereon a program for executing an operation method of a terminal, the operation method including: executing a voice call service between the terminal and at least one terminal; determining at least one short-range terminal existing within a preset range from among the at least one terminal, based on location information of the terminal; detecting a howling frequency band in which howling occurs between the terminal and the at least one short-range terminal from among a plurality of frequency bands in which the voice call service is performed, based on information of the plurality of frequency bands; and removing the howling by adjusting a gain of the howling frequency band.

Advantageous Effects of the Invention

The call quality of a terminal may be improved by removing or suppressing howling occurring between terminals during a call.

Also, sound quality degradation and power consumption of a terminal may be minimized by removing howling.

Also, howling may be more efficiently removed when a distance between terminals is short.

BEST MODE

Figure 1:
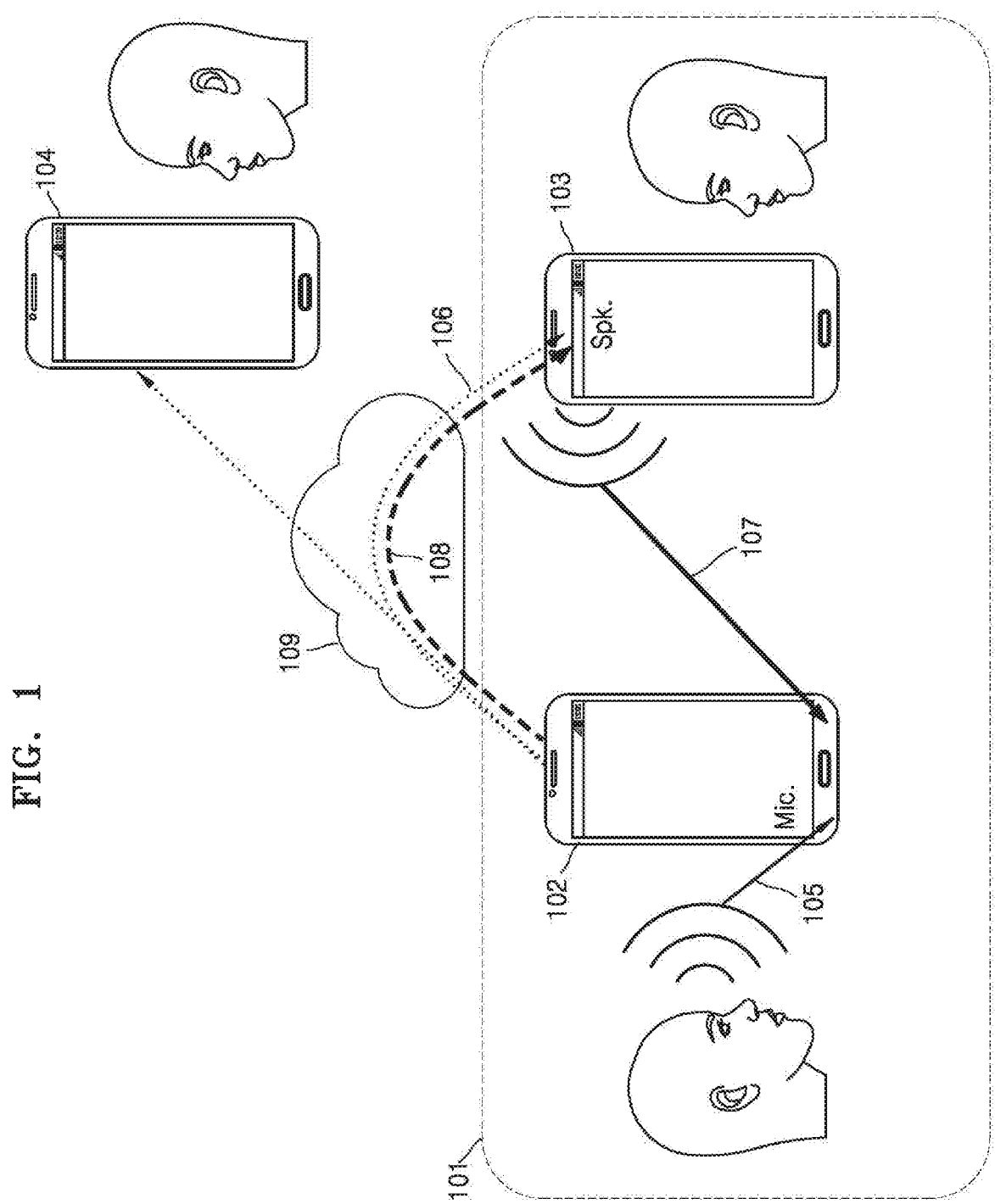
FIG. 1 is a diagram for explaining howling occurring when a plurality of users make a voice call, according to an embodiment.

An operation method of a terminal may include: executing a voice call service between the terminal and at least one terminal; determining at least one short-range terminal existing within a preset range from among the at least one terminal, based on location information of the terminal; detecting a howling frequency band in which howling occurs between the terminal and the at least one short-range terminal from among a plurality of frequency bands in which the voice call service is performed, based on information of the plurality of frequency bands; and removing the howling by adjusting a gain of the howling frequency band.

MODE OF THE INVENTION

The terms used in the present invention have been selected from general terms in consideration of functions in the present invention. However, these terms may vary according to the intention of any person of ordinary skill in the art, legal precedents, or the advent of new technology. Further, for special cases, for terms selected by the applicant, the meanings of these selected terms are described in detail in the Detailed Description section. Accordingly, the terms used in the present invention are defined based on the descriptions throughout the specification, not by their simple meanings.

When a part "includes" a certain constituent element, unless specified otherwise, it may not be construed to exclude another constituent element, but instead may be construed to further include other constituent elements. The term "unit" used herein means a software component or a hardware component such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The term "howling" used herein refers to a phenomenon in which a sound output from a speaker is input to a microphone, is amplified by an amplifier, is output from the speaker, and is input to the microphone again. Howling that is feedback oscillation occurs when a signal in a feedback loop exceeds a predetermined level. Howling will be described below in more detail.

Hereinafter, embodiments of the present invention will be described in detail with reference to the accompanying drawings in order to enable one of ordinary skill in the art to easily embody and practice the present invention. However, the present invention is not limited to the embodiments disclosed below, but may be implemented in various forms.

FIG. 1 is a diagram for explaining howling occurring when a plurality of users make a voice call, according to an embodiment.

A phenomenon in which a sound signal input to a microphone of a single system such as a sound system in the same space is output from a speaker of the single system and then is input to the microphone of the single system again is referred to as howling.

Since a general voice call is used for voice transmission between remote users, call quality may be improved by removing only an acoustic echo signal generated when an output from a speaker of a terminal is input to a microphone of the terminal.

As a push-to-talk service in which a multi-party call may be made and hundreds of people may simultaneously participate has increased, the probability that a plurality of users may use a PTT service or a remote call even within a short range has increased.

As shown in FIG. 1, a first user of a first terminal 102, a second user of a second terminal 103, and a third user of a third terminal 104 may execute a voice call service (e.g., a multi-party call) through a network 109. Since the third terminal 104 is far from the first terminal 102 and the second terminal 103, the probability that howling may occur in the third terminal 104 is not high. However, when a physical distance between the first terminal 102 and the second terminal 103 is short, that is, when the first terminal 102 and the second terminal 103 are included in a first short-range group 101, although only a voice 105 of the first user has to be input to the first terminal 102, a voice output from the second terminal 103 may be input to a microphone of the first terminal 102. Accordingly, howling paths 107 and 108 may be formed between the first terminal 102 and the second terminal 103.

The first terminal 102 may detect a howling frequency band in which howling occurs from among a plurality of frequency bands in which a voice call is performed based on information of the plurality of frequency bands. Also, the first terminal 102 may remove or suppress the howling by adjusting a gain of the detected howling frequency band.

The present disclosure relates to technology for a sensor network, machine to machine (M2M), machine type communication (MTC), and Internet of Things (IoT). The present disclosure may be applied to intelligent services based on the technology (e.g., a smart home, a smart building, a smart city, a smart car or a connected car, health care, digital education, retail business, and security and safety related services).

Although the first terminal 102, the second terminal 103, and the third terminal 104 are smart phones in FIG. 1, embodiments are not limited thereto and various modifications may be made. Examples of each of the first through third terminals 102, 103, and 104 may include a mobile terminal such as a cellular phone, a personal communications service (PCS) phone, synchronous/asynchronous International mobile telecommunication-2000 (IMT-2000) enabling wireless communication, a personal digital assistant (PDA), a wireless application protocol (WAP) phone, a mobile play-station, or a portable multimedia player (PMP), and may also include any of various terminals for home use or business use that may receive a mobile communication service through a mobile communication network 110 such as a notebook personal computer (PC), a desktop PC, or a palm PC.

Also, the voice call service may be executed through various mobile communication networks for a mobile communication service such as a wideband code division multiple access (WCDMA) network, a wireless fidelity (Wi-Fi) network, or a WiBro network, a home location register (HLR), and a silent call server. Also, the voice call service may be executed in interoperation with a public switched telephone network (PSTN) or the Internet.

Also, examples of the voice call service may include an analog voice call service, a digital voice call service, a voice call service using a third generation mobile communication network, and a voice call service using a fourth mobile communication network (e.g., voice over long-term evolution (VoLTE)).

A method of suppressing or removing howling occurring between terminals will now be explained with reference to FIGS. 2 through 8.

Figure 2:
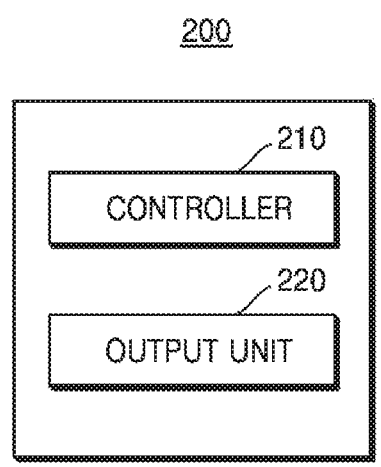
FIG. 2 is a block diagram illustrating a configuration of a terminal according to an embodiment.

FIG. 2 is a block diagram illustrating a configuration of a terminal 200 according to an embodiment.

According to an embodiment, the terminal 200 may include a controller 210 and an output unit 220. The terminal 200 may include elements more or less than those illustrated in FIG. 2. The elements will now be sequentially described.

The controller 210 may execute a voice call service between the terminal 200 and at least one terminal. That is, the controller 210 may control the terminal 200 to execute a voice call with a plurality of terminals including a first terminal and a second terminal. The term "at least one terminal" used herein refers to a terminal that executes the voice call with the terminal 200.

The controller 210 may determine at least one short-range terminal existing within a preset range from among the at least one terminal based on location information of the terminal 200. The term "short-range terminal" used herein refers to a terminal existing within the preset range from the terminal 200.

When a distance between terminals is short, the probability that howling occurs during a voice call is high. Accordingly, the controller 210 may determine the short-range terminal existing within the preset range from the terminal 200 based on the location information of the terminal 200. For example, the preset range may be a range within a radius of 20 m from the terminal 200. It will be understood by one of ordinary skill in the art to which the present embodiment pertains that the preset range may be set to a range within a radius greater or less than 20 m. The term "short-range terminal" used herein refers to a terminal 200 within the preset range from the terminal 200.

The controller 210 may detect a howling frequency band from among a plurality of frequency bands in which the voice call service is performed, based on information of the plurality of frequency bands. The howling frequency band is a frequency band in which howling occurs between the terminal 200 and the short-range terminal. The information of the plurality of frequency bands may include at least one from among a peak value and an energy value of each of the plurality of frequency bands.

The controller 210 may obtain an energy change rate of each of the plurality of frequency bands based on input voice information of at least one short-range terminal and output voice information of the terminal 200. The controller 210 may detect the howling frequency band based on the energy change rate of each of the plurality of frequency bands. In detail, when an energy change rate of a predetermined frequency band from among the plurality of frequency band exceeds a preset change rate, the controller 210 may detect the predetermined frequency band as the howling frequency band.

Also, the controller 210 may obtain voice loop cycle information of the voice call service. The controller 210 may detect a predetermined frequency band whose an energy change rate is periodically changed according to the voice loop cycle information from among the plurality of frequency bands as the howling frequency band based on the voice loop cycle information.

The controller 210 may remove the howling by adjusting a gain of the howling frequency band. The controller 210 may adjust the gain of the howling frequency band in which the howling is detected, based on at least one from among the information of the plurality of frequency bands, the voice loop cycle information of the voice call service, a distance between the terminal 200 and the at least one short-range terminal, and the number of the at least one short-range terminal.

The controller 210 may adjust a filter coefficient of a filter used to remove the howling. For example, the controller 210 may adjust the filter coefficient based on howling information about an input to a microphone of the short-range terminal.

Alternatively, the controller 210 may determine the filter coefficient so that the gain of the howling frequency band decreases as the distance between the terminal 200 and the at least one short-range terminal decreases. Also, the controller 210 may determine the filter coefficient so that the gain of the howling frequency band increases as the distance between the terminal 200 and the at least one short-range terminal increases.

The controller 210 may include a notch filter. The notch filter that removes only a component in a specific frequency band is the opposite to a band-pass filter that passes only a component in a specific frequency band. The notch filter may be used to remove a signal such as interference waves or harmonics. The notch filter may remove the howling by adjusting the gain of the howling frequency band in which the howling is detected. Also, the controller 210 may include another type of filter for removing a gain value according to each frequency band, instead of the notch filter.

The output unit 220 may output a voice from which the howling is removed. The output unit 220 may be, but is not limited to, a speaker.

According to an embodiment, the terminal 200 may further include a communicator (not shown) and a memory (not shown). The communicator (not shown) may transmit, to the at least one short-range terminal through a wireless network, at least one from among the information of the plurality of frequency bands, the distance between the terminal 200 and the at least one short-range terminal, voice call delay time information of the voice call service, and volume information of the terminal 200. Since the terminal 200 shares at least one from among the information of the plurality of frequency bands, the distance between the terminal 200 and the at least one short-range terminal, the voice call delay time information of the voice call service, and the volume information of the terminal 200 with the short-range terminal, a howling detection speed and accuracy may be increased, thereby removing the howling occurring between the terminal 200 and the short-range terminal with minimum sound quality degradation.

Examples of the wireless network may include, but are not limited to, a wireless local area network (WLAN), Wi-Fi, Bluetooth, ZigBee, Wi-Fi Direct (WFD), Ultra-wide-band (UWB), Infrared Data Association (IrDA), Bluetooth Low Energy (BLE), and Near-Field Communication (NFC).

The memory (not shown) may store the information of the plurality of frequency bands, information of the howling frequency band (e.g., the howling frequency band and the gain of the howling frequency band), and information of the filter (e.g., the filter coefficient).

The memory (not shown) may store messages corresponding to a plurality of users and identification information of the plurality of users. The memory (not shown) may include at least one type of storage medium from among a flash memory type memory, a hard disk type memory, a multimedia card micro type memory, a card type memory (e.g., an SD or XD memory), a random-access memory (RAM), a static random-access memory (SRAM), a read-only memory (ROM), an electrically erasable programmable read-only memory (EEPROM), a programmable read-only memory (PROM), a magnetic memory, a magnetic disk, and an optical disk.

The terminal 200 may include a central arithmetic processor, and may control overall operations of the controller 210, the output unit 220, the communicator (not shown), and the memory (not shown). The central arithmetic processor may be an array of logic gates, or may be a combination of a general-purpose microprocessor and a memory in which a program that may be executed in the microprocessor is stored. Also, it will be understood by one of ordinary skill in the art that the central arithmetic processor may be any of other types of hardware.

Various operations or applications of the terminal 200 will now be explained. It will be understood by one of ordinary skill in the art that even when any of the controller 210, the output unit 220, the communicator (not shown), and the memory (not shown) is not specified, each operation or application that may be clearly understood and expected by one of ordinary skill in the art may be understood as typical implementation and the scope of the present invention is not limited by names or physical/logical structures of specific elements.

Figure 3:
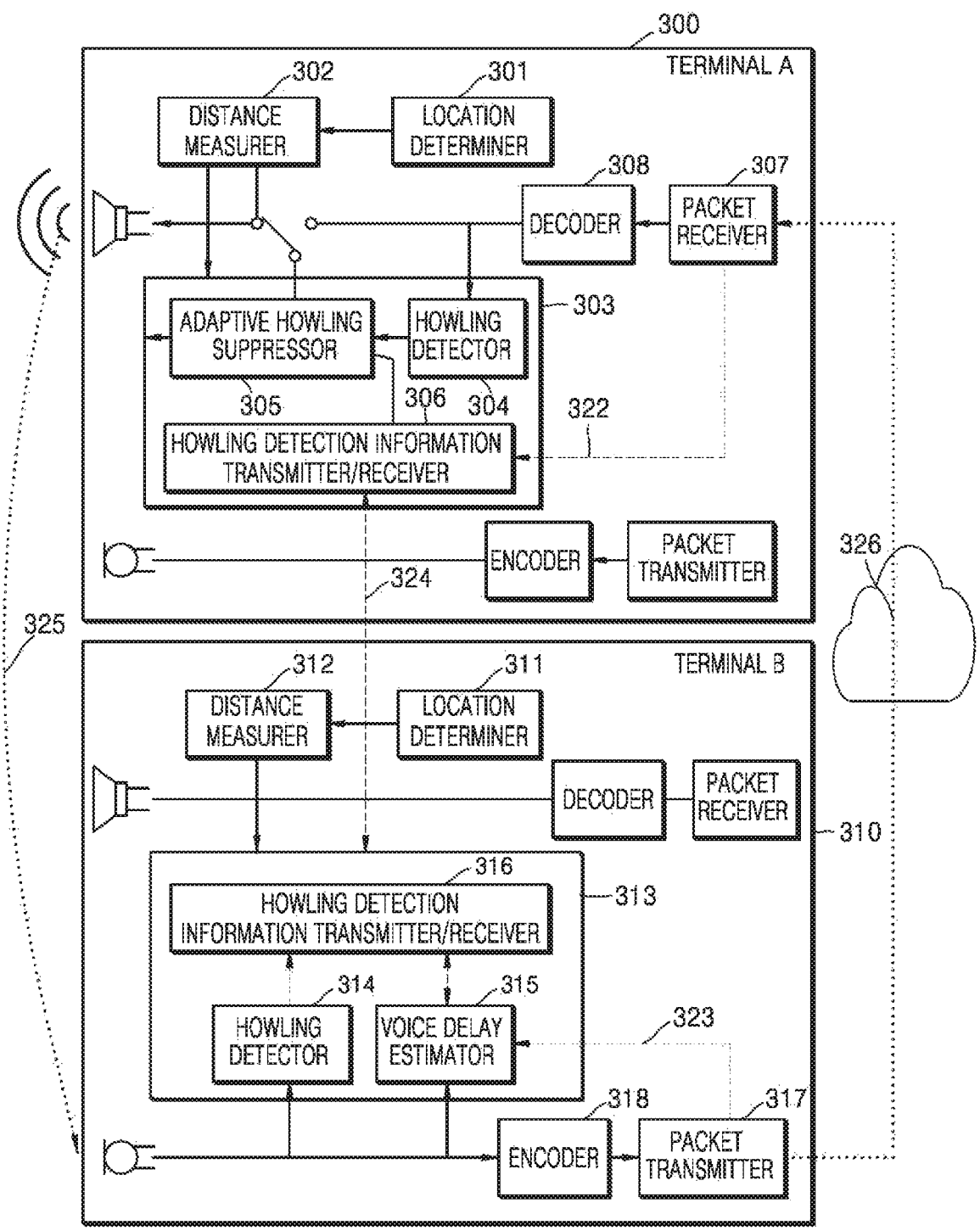
FIG. 3 is a diagram illustrating detailed configurations of a reception terminal and a transmission terminal for explaining howling removal, according to an embodiment.

FIG. 3 is a diagram illustrating detailed configurations of a reception terminal 300 and a transmission terminal 310 for explaining howling removal, according to an embodiment.

FIG. 3 illustrates the reception terminal 300 and the transmission terminal 310 at a first time during a voice call. At a second time, the reception terminal 300 at the first time may become the transmission terminal 310 and the transmission terminal 310 at the first time may become the reception terminal 300. Also, although the reception terminal 300 and the transmission terminal 310 are separately illustrated in FIG. 3 for convenience of explanation, each terminal may include both a configuration of the reception terminal 300 and a configuration of the transmission terminal 310.

The reception terminal 300 of FIG. 3 may include a location determiner 301, a distance measurer 302, a howling suppression module 303, a packet receiver 307, a decoder 308, an encoder, and a packet transmitter. The howling suppression module 303 may include a howling detector 304, a howling suppressor 305, and a howling detection information transmitter/receiver 306.

Also, the reception terminal 300 of FIG. 3 may correspond to the terminal 200 of FIG. 2. The controller 210 of the terminal 200 of FIG. 2 may correspond to the location terminal 301, the distance measurer 302, the howling suppression module 303, the packet receiver 307, the decoder 308, the encoder, and the packet transmitter of the reception terminal 300.

The reception terminal 300 may include elements more or less than those illustrated in FIG. 3. The elements will now be sequentially described.

The location determiner 301 may detect a location of the reception terminal 300, and may determine whether a terminal participating in the same call exists within a short range from the reception terminal 300. The location determiner 301 may collect time information of a global positioning system (GPS) or a server system for time synchronization between terminals. The location determiner 301 may detect location information through the GPS, a wireless communication base station, or a Wi-Fi access point (AP), and may share the location information with a communication server.

The distance measurer 302 may measure a distance between terminals within a range in which howling may occur. Since the distance measurer 302 has to perform additional calculation by separately driving sound hardware or Bluetooth hardware, an operation of the distance measurer 302 may be minimized through the location determiner 301.

When the location determiner 301 determines that a terminal participating in the voice call exists within the short range, the distance measurer 302 may determine whether the terminal exists within the range in which howling may occur. A distance may be measured by using a general method. A distance may be measured by using Bluetooth or sound waves. Also, the terminal may include an additional sensor for measuring a distance.

The howling suppression module 303 of the reception terminal 300 may include the howling detector 304, the howling detection information transmitter/receiver 306, and the howling suppressor 305.

The howling detector 304 may detect a band estimated as divergence after frequency analysis. Since a voice call system (e.g., a multi-party call system) has a considerably long and irregular network delay, howling between short-range terminals may occur after delayed by a loop delay time, unlike howling occurring in a single system. Accordingly, the howling between the short-range terminals may be accurately and rapidly detected by considering network and terminal delays.

The howling detector 304 may divide a voice signal into frequency bands according to auditory characteristics of a user, and may detect howling through time statistical analysis of energy and peak values of the frequency bands.

Also, the howling detector 304 may obtain energy change rate information of each frequency band by analyzing an output voice of the reception terminal 300 and an input voice of the transmission terminal 310. The howling detector 304 may detect howling based on the obtained energy change rate information of each frequency band. For example, when an energy change rate of a predetermined frequency band is high, the howling detector 304 may determine that howling occurs in the predetermined frequency band and may detect the howling.

Also, the howling detector 304 may determine whether the energy change rate of the predetermined frequency band is periodically changed by using voice loop cycle information. When the energy change rate of the predetermined frequency band is periodically changed, the howling detector 304 may determine the predetermined frequency band as a frequency band in which howling occurs.

The howling detector 304 may also detect a user voice of the transmission terminal 310. This is because when a user voice input is mistakenly determined as howling, the howling suppressor 305 of the reception terminal 300 may mistakenly operate and thus an output voice of the reception terminal 300 may be greatly distorted. In detail, when a voice of the user is consonants, the voice of the user is similar to white noise, and thus the voice of the user may be distinguished from howling. Also, when the voice of the user is vowels, the voice of the user may be distinguished from howling by using the periodic properties of a peak frequency.

The howling suppressor 305 may perform a filtering operation of reducing a gain of the predetermined frequency band in which howling amplification is detected to a level at which howling divergence does not occur. The howling suppressor 305 may repeatedly perform a process of receiving detection information of the howling detector 304 of the transmission terminal 310 and obtaining an optimal gain value. The detection information of the howling detector 304 may include at least one from among the peak and energy values of the frequency bands divided according to the auditory characteristics of the user.

The howling suppressor 305 may include a filter. The filter may reduce a gain value of a frequency band in which howling occurs when a distance between the reception terminal 300 and the transmission terminal 310 decreases. Also, the filter may increase the gain value of the frequency band in which the howling occurs when the distance between the reception terminal 300 and the transmission terminal 310 increases.

The howling suppressor 305 may use the number of the transmission terminals 310 located within the short range from the reception terminal 300 to remove howling. In detail, as the number of the transmission terminals 310 located within the short range from the reception terminal 300 increases, an input voice volume of the transmission terminals 310 increases, thereby increasing the probability that howling amplification occurs. Accordingly, the howling suppressor 305 may increase a suppression rate of a howling suppression filter according to the number of the transmission terminals 310 located within the short range from the reception terminal 300.

The howling detection information transmitter/receiver 306 may transmit/receive the detection information of the howling detector 304 and time synchronization between the reception terminal 300 and the transmission terminal 310.

The howling detection information transmitter/receiver 306 may transmit, to the transmission terminal 310, information of a plurality of frequency bands (e.g., a peak value and an energy value of each frequency band), a distance between the reception terminal 300 and the transmission terminal 310, voice call delay time information of a voice call service, and acoustic volume information of the reception terminal 300.

When the howling detection information transmitter/receiver 306 transmits/receives the detection information, a network used to transmit a voice packet may be used. Also, the howling detection information transmitter/receiver 306 may transmit/receive howling detection information and synchronization information by using device to device (D2D) communication. Since the D2D communication is used, the howling suppression module 303 may rapidly suppress or remove howling as soon as the howling occurs.

Since sound hardware during a voice call is always operating, the howling detection information transmitter/receiver 306 may also use ultra-sound communication technology using an inaudible band. When sound communication technology is used, a plurality of terminals within a short range may perform short-range communication, and thus data may be separated between terminals by using spreading code.

The packet receiver 307 may receive a voice signal through a network 326 from the transmission terminal 310, and may transmit the voice signal to the decoder 308. Also, the packet receiver 307 may also transmit the voice signal to the howling detection information transmitter/receiver 306.

The transmission terminal 310 of FIG. 3 may include a location determiner 311, a distance measurer 312, a howling suppression module 313, a packet transmitter 317, an encoder 318, a decoder, and a packet receiver. The howling suppression module 313 may include a howling detector 314, a voice delay estimator 315, and a howling detection information transmitter/receiver 316.

Elements other than the voice delay estimator 315 of the transmission terminal 310 may respectively correspond to elements other than the howling suppressor 305 of the reception terminal 300. The location determiner 311, the distance measurer 312, the howling detector 314, the howling detection information transmitter/receiver 316, the packet transmitter 317, the encoder 318, the decoder, and the packet receiver of the transmission terminal 310 may respectively correspond to the location determiner 301, the distance measurer 302, the howling detector 304, the howling detection information transmitter/receiver 306, the packet receiver 307, the decoder 308, the encoder, and the packet transmitter of the reception terminal 300.

The transmission terminal 310 may include elements more or less than those illustrated in FIG. 3. The elements will be now sequentially described.

The voice delay estimator 315 may track a cycle of a howling loop including network and terminal latency. Since a delay due to terminal latency and acoustic echo is almost fixed when a call environment is not changed whereas a network delay is very irregular in a general network where quality of service (QoS) is not guaranteed, a delay time needs to be continuously estimated.

The voice delay estimator 315 may estimate a delay time in consideration of a network delay, a terminal delay, and an acoustic delay based on an absolute time synchronized between short-range terminals.

The encoder 318 may transmit a voice signal to the packet transmitter 317, and the packet transmitter 317 may transmit the voice signal to the packet receiver 307. Also, the packet transmitter 317 may transmit the voice signal to the voice delay estimator 315.

Figure 4:
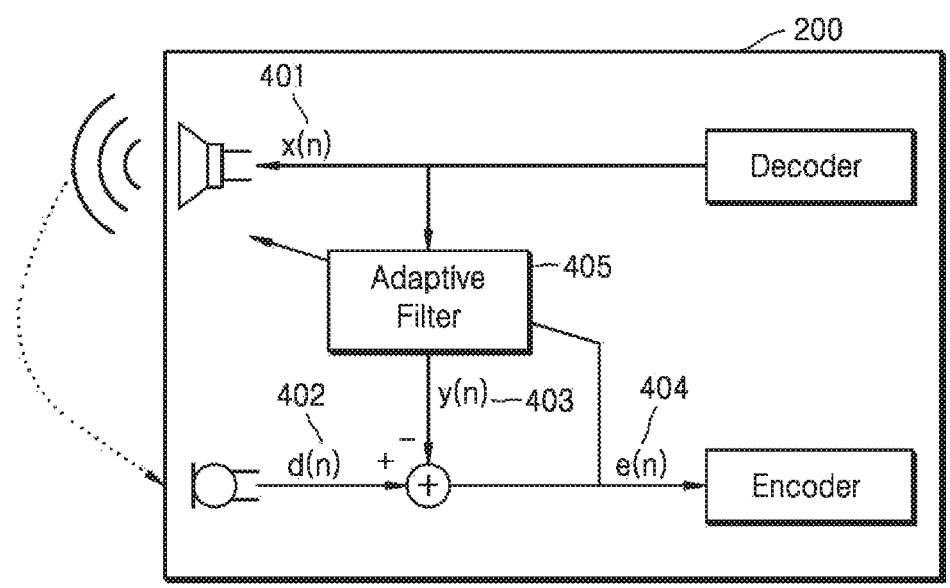
FIG. 4 is a diagram for explaining howling removal, according to an embodiment.

FIG. 4 is a diagram for explaining howling removal, according to an embodiment.

Referring to FIG. 4, a signal $x(n)$ 401 output from a speaker may be affected by spatial acoustic echo and characteristics of a microphone and a speaker. It is assumed that a system of FIG. 4 is a linear system. As shown in FIG. 4, the terminal 200 uses the signal $x(n)$ 401 output from the speaker and a signal $d(n)$ 402 input to the microphone, and generates an adaptive filter $h(n)$ 405 through a prediction algorithm. The terminal 200 generates an output $y(n)$ 403 by inputting the signal $x(n)$ 401 to the generated adaptive filter h(n) 405. When the prediction algorithm accurately predicts the adaptive filter h(n) 405, the output y(n) 403 and the signal d(n) 402 may be the same, and otherwise, an error e(n) 404 may occur. The terminal 200 may re-adjust a coefficient of the adaptive filter h(n) 405 by using the collected error e(n) 404, and may remove acoustic echo and howling by maintaining the adaptive filter h(n) 405 to minimize the error e(n) 404.

Although only specific elements for removing howling in the terminal 200 are illustrated in FIG. 4, it will be understood by one of ordinary skill in the art that the specific elements are merely provided for better understanding of the present invention, and the present invention may be embodied and practiced even without the specific elements. Also, it will be understood by one of ordinary skill in the art that general-purpose elements other than the elements illustrated in FIG. 4 may be further included.

Figure 5:
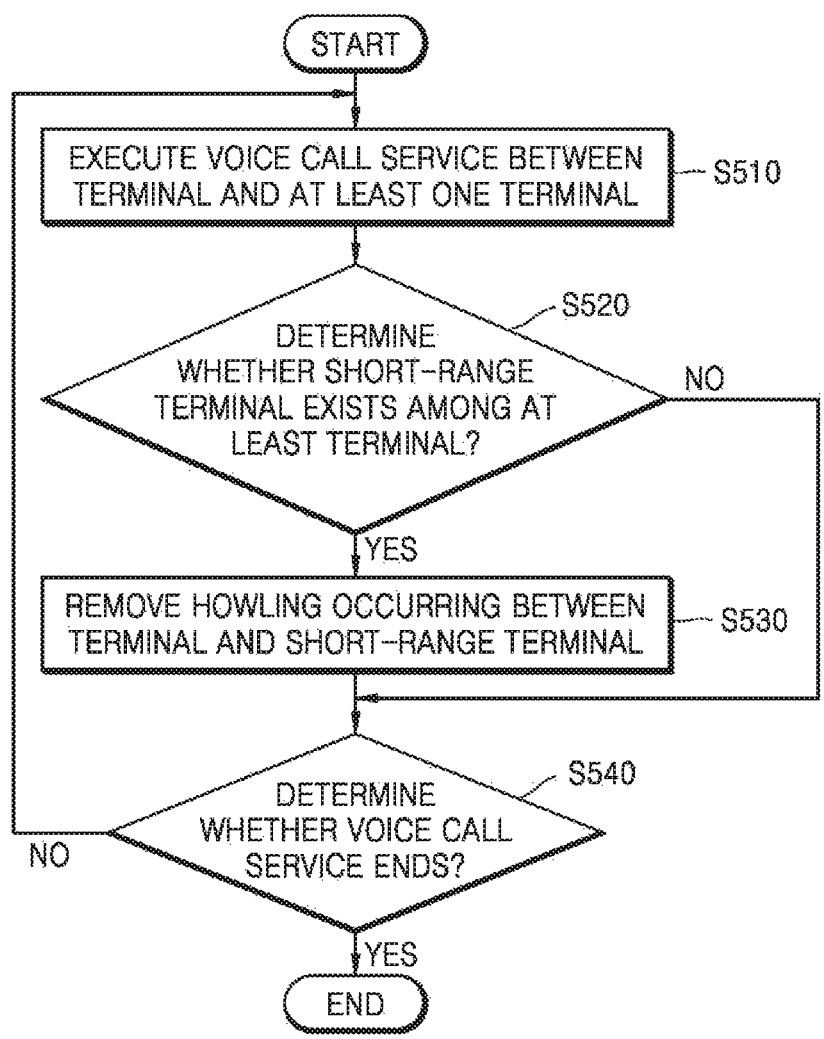
FIG. 5 is a flowchart illustrating an operation method of the terminal according to an embodiment.

FIG. 5 is a flowchart illustrating an operation method of the terminal 200 according to an embodiment.

In operation S510 of FIG. 5, the terminal 200 may execute a voice call service to perform voice communication with at least one terminal. Examples of the voice call service may include an analog voice call service, a digital voice call service, a voice call service using a third generation mobile communication network, and a voice call service using a fourth generation mobile communication network (e.g., VoLTE).

In operation S520, the terminal 200 may determine whether a short-range terminal exists among the at least one terminal. The terminal 200 may determine whether at least one short-range terminal exists within a preset range from among the at least one terminal based on location information of the terminal 200. When it is determined in operation S520 that the at least one short-range terminal exists, the terminal 200 performs operation S530. Also, when it is determined in operation S520 that the at least one short-range terminal does not exist, the terminal 200 performs operation S540.

In operation S530, the terminal 200 may remove howling occurring between the terminal 200 and the short-range terminal. The terminal 200 may analyze a plurality of frequency bands in which the voice call service is performed, and may detect a howling frequency band according to analysis result. For example, when an energy change rate of one of the plurality of frequency bands exceeds a preset change rate, the terminal 200 may detect the frequency band exceeding the preset change rate as the howling frequency band. The terminal 200 may remove the howling by adjusting a gain of the howling frequency band. A method of removing the howling will be explained in detail with reference to FIG. 6 though 8.

In operation S540, the terminal 200 determines whether the terminal 200 ends the voice call service with the at least one terminal. When it is determined in operation S540 that the voice call service ends, an operation of the terminal 200 ends. Also, when it is determined in operation S540 that the voice call service does not end, the terminal 200 returns to operation S510 and performs operation S510 again.

Figure 6:
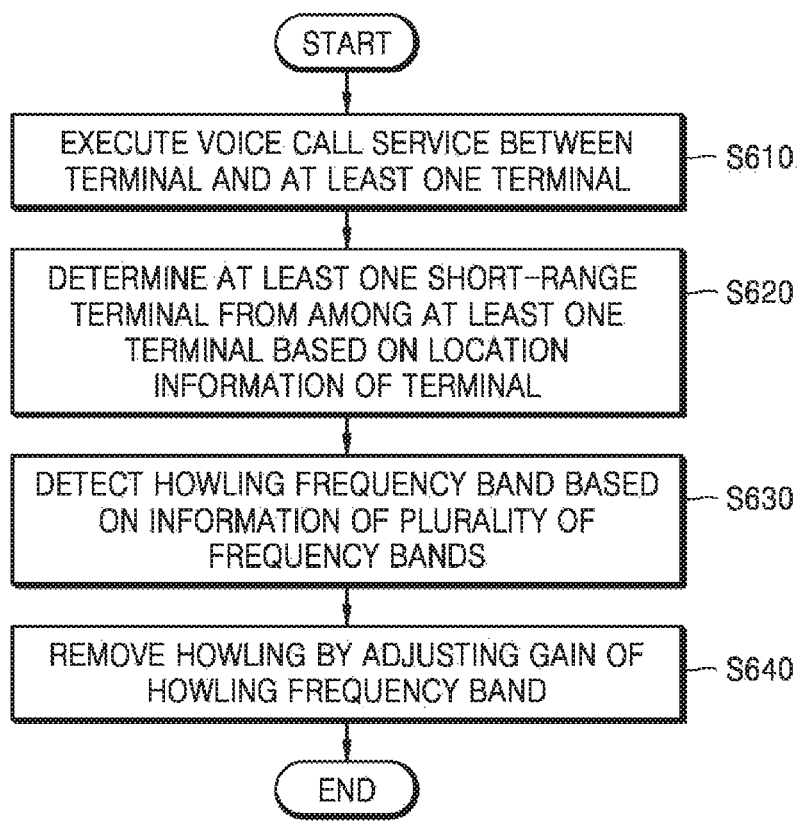
FIG. 6 is a flowchart illustrating an operation method of the terminal according to another embodiment.

FIG. 6 is a flowchart illustrating an operation method of the terminal 200 according to another embodiment.

In operation S610 of FIG. 6, the terminal 200 may execute a voice call service between the terminal 200 and at least one terminal. Operation S610 may correspond to operation S510 of FIG. 5.

In operation S620, the terminal 200 may determine at least one short-range terminal from among the at least one terminal based on location information of the terminal 200.

There may exist a terminal that is physically far from the terminal 200 and a terminal that is physically close to the terminal 200 from among the at least one terminal. When an output of a transmission terminal is input to an input end of a reception terminal, a distance between the reception terminal and the transmission terminal may be short and thus a voice of a user of the transmission terminal may be input to the input end of the reception terminal, thereby causing howling.

The terminal 200 may detect whether howling occurs in a terminal within a short range from the terminal 200, and may remove the howling when the howling is detected. The terminal 200 may determine at least one short-range terminal existing within a preset range from among the at least one terminal, based on location information of the terminal 200.

The terminal 200 may more efficiently remove howling by generating the determined at least one short-range terminal and the terminal 200 as a short-range group. For example, when the short-range group is generated, the terminal 200 may perform an operation of removing howling. In contrast, when the short-range group is removed, the terminal 200 may stop the operation of removing howling.

Figure 7:
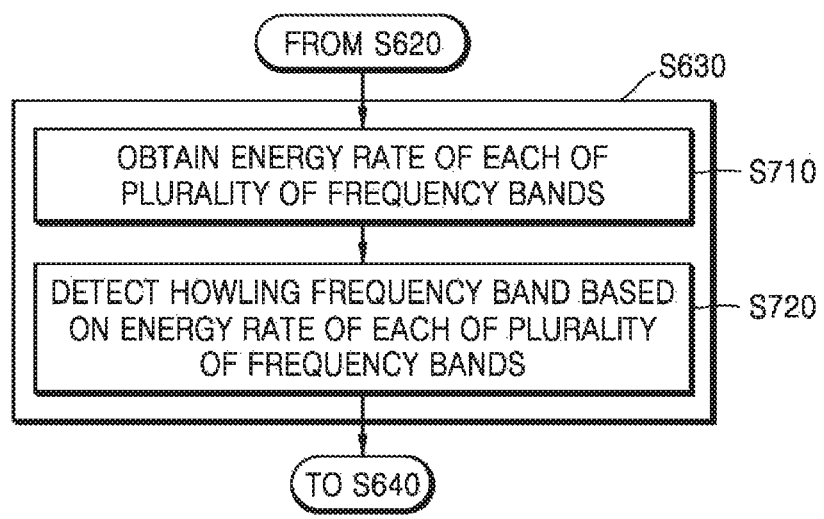
FIG. 7 is a flowchart for explaining a method of detecting a howling frequency band, according to an embodiment.

In operation S630, the terminal 200 may detect a howling frequency band based on information of a plurality of frequency bands. The terminal 200 may detect the howling frequency band from among the plurality of frequency bands in which the voice call service is performed, based on the information of the plurality of frequency bands. The howling frequency band is a frequency band in which howling occurs between the terminal 200 and the at least one short-range terminal. The information of the plurality of frequency bands may include at least one from among, but not limited to, an energy value of each of the plurality of frequency bands and a peak value of each of the plurality of frequency bands. FIG. 7 is a flowchart for explaining operation S630 of FIG. 6.

In operation S710 of FIG. 7, the terminal 200 may obtain an energy change rate of each of a plurality of frequency bands. The terminal 200 may obtain the energy change rate of each of the plurality of frequency bands based on input voice information of the at least one short-range terminal and output voice information of the terminal 200.

In operation S720, the terminal 200 may detect the howling frequency band, based on the energy change rate of each of the plurality of frequency bands. For example, when an energy change rate of a predetermined frequency band from among the plurality of frequency bands exceeds a preset change rate, the terminal 200 may detect the predetermined frequency band as the howling frequency band.

Also, the terminal 200 may obtain voice loop cycle information of the voice call service. The terminal 200 may detect a predetermined band whose energy change rate is periodically changed according to the voice loop cycle information from among the plurality of frequency bands as the howling frequency band, based on the voice loop cycle information.

The terminal 200 may transmit the information of the plurality of frequency bands (e.g., a peak value or an energy value of each of the frequency bands) to the short-range terminal. That is, since the terminal 200 transmits, to the short-range terminal, at least one from among the information of the plurality of frequency bands, a distance between the at least one short-range terminal and the terminal 200, voice call delay time information of the voice call service, and volume information of the terminal 200, a howling detection speed and accuracy may be increased, thereby removing howling occurring between the short-range terminal and the terminal 200 with minimum sound quality degradation.

Figure 8:
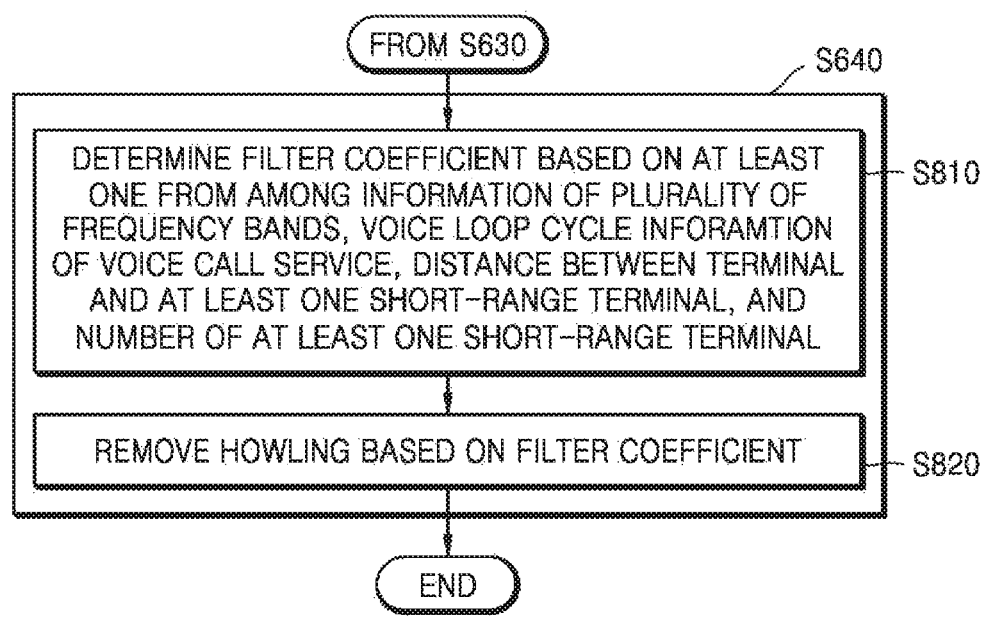
FIG. 8 is a flowchart for explaining a method of removing howling, according to an embodiment.

In operation S640, the terminal 200 may remove the howling by adjusting a gain of the howling frequency band. FIG. 8 is a flowchart for explaining operation S640 of FIG. 6.

In operation S810, the terminal 200 may determine an optimal filter coefficient of a filter used to remove the howling, based on at least one from among the information of the plurality of frequency bands, the voice loop cycle information of the voice call service, the distance between the terminal 200 and the at least one short-range terminal, and the number of the at least one short-range terminal.

For example, the terminal 200 may determine the filter coefficient so that the gain of the howling frequency band decreases as the distance between the terminal 200 and the at least one short-range terminal decreases. Also, the terminal 200 may determine the filter coefficient so that the gain of the howling frequency band increases as the distance between the terminal 200 and the at least one short-range terminal increases.

Alternatively, when a plurality of the short-range terminals exist, the probability that howling occurs increases. Accordingly, the terminal 200 may determine the filter coefficient by reflecting the number of the short-range terminals.

The terminal 200 may continuously monitor whether howling occurs and may determine the filter coefficient when the howling is detected. The terminal 200 may use howling information of a microphone input detected by the transmission terminal to determine an optimal filter coefficient.

In operation S820, the terminal 200 may remove the howling based on the filter coefficient. The terminal 200 may include a circuit for forming a notch filter. The notch filter may remove the howling by adjusting the gain of the frequency band in which the howling is detected.

Figure 9:
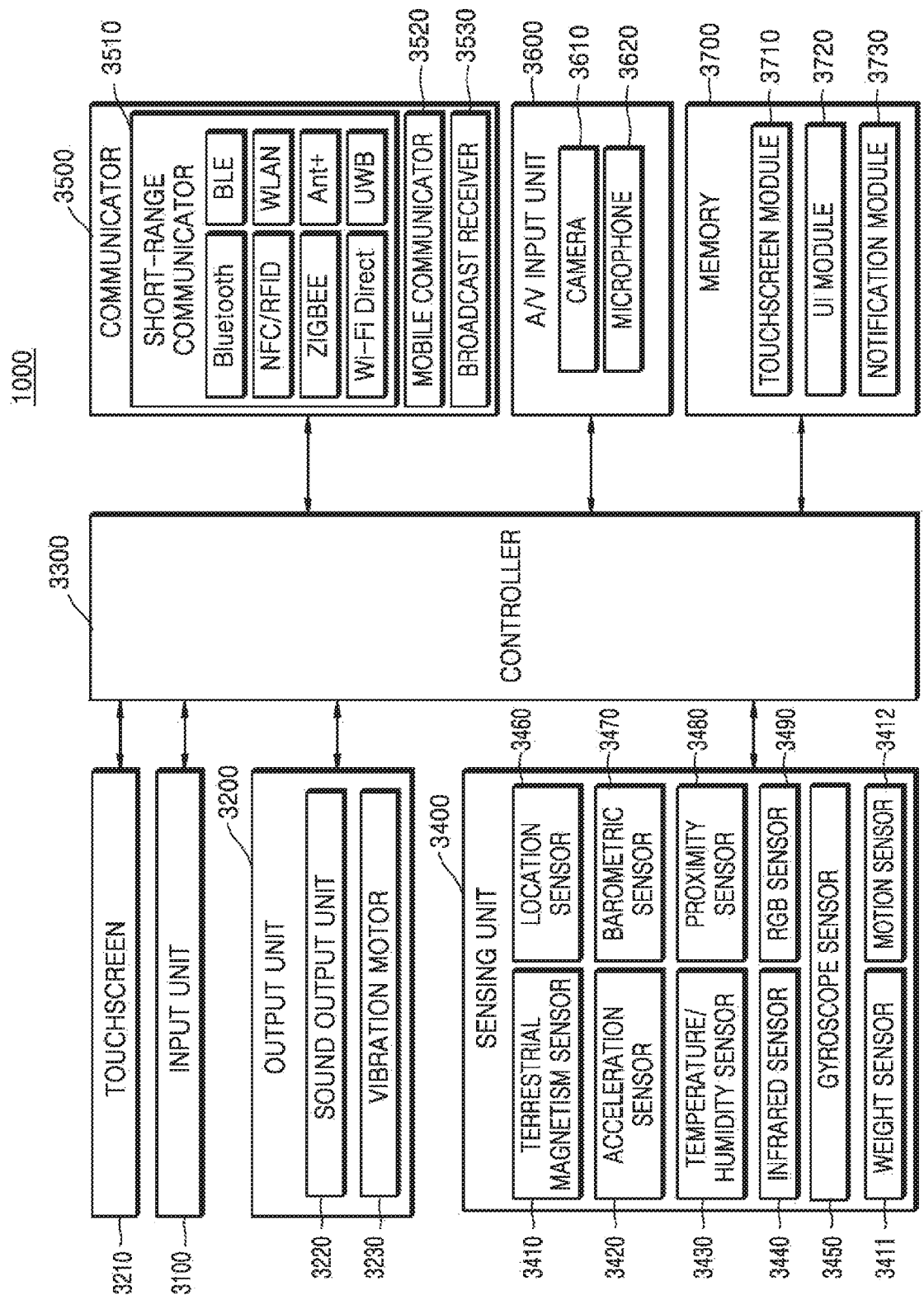
FIG. 9 is a block diagram illustrating a configuration of a terminal related to the present invention, according to an embodiment.

FIG. 9 is a block diagram illustrating a configuration of a terminal 1000 related to the present invention, according to an embodiment.

The terminal 1000 of FIG. 9 may correspond to the terminal 200 of FIG. 2. In detail, a controller 3300 of FIG. 9 may correspond to the controller 210 of FIG. 2, an output unit 3200 of FIG. 9 may correspond to the output unit 220 of FIG. 2, and a communicator 3500 of FIG. 9 may correspond to the communicator (not shown) of the terminal 200 of FIG. 2.

An input unit 3100 refers to a unit by which a user inputs data for controlling the terminal 1000. Examples of the input unit 3100 may include, but are not limited to, a keypad, a dome switch, a touchpad (e.g., a contact-type capacitance method, a pressure-type resistance film method, an infrared sensing method, a surface ultrasound transmission method, an integral tension measuring method, or a piezoelectric effect method), a jog wheel, and a jog switch.

The output unit 3200 may output an audio signal, a video signal, or a vibration signal. The output unit 3200 may include a sound output unit 3220 and a vibration motor 3230.

A touchscreen 3210 may include at least one from among a liquid crystal display, a thin-film transistor-liquid crystal display, an organic light-emitting diode, a flexible display, a three-dimensional (3D) display, and an electrophoretic display. The terminal 1000 may include two or more touchscreens 3210 according to a type of the terminal 1000. In this case, the two or more touchscreens 3210 may face each other by using a hinge.

The sound output unit 3220 outputs audio data received from the communicator 3500 or stored in a memory 3700. Also, the sound output unit 3220 outputs a sound signal related to a function performed by the terminal 1000 (e.g., a call signal receiving sound, a message receiving sound, or a notification sound). The sound output unit 3220 may include a speaker or a buzzer.

The vibration motor 3230 may output a vibration signal. For example, the vibration motor 3230 may output a vibration signal corresponding to an output of audio data or vide data (e.g., a call signal receiving sound or a message receiving sound). Also, the vibration motor 3230 may output a vibration signal when a touch is input to the touchscreen 3210.

The controller 3300 may control an overall operation of the terminal 1000. For example, the controller 3300 may control elements included in the terminal 1000 to operate by executing a program stored in the memory 3700.

A sensing unit 3400 may detect the user's body contact and may obtain bio-information based on the detected body contact. The sensing unit 3400 may include at least one from among, but not limited to, a terrestrial magnetism sensor 3410, a weight sensor 3411, a motion sensor 3412, an acceleration sensor 3420, a temperature/humidity sensor 3430, an infrared sensor 3440, a gyroscope sensor 3450, a location sensor 3460, a barometric sensor 3470, a proximity sensor 3480, and an RGB sensor 3490. The function of each sensor may be intuitively inferred by one of ordinary skill in the art from its name, and thus a detailed explanation thereof will not be given.

The communicator 3500 may include one or more elements for performing communication between the terminal 1000 and an external device (not shown). For example, the communicator 3500 may include a short-range communicator 3510, a mobile communicator 3520, and a broadcast receiver 3530.

Examples of the short-range communicator (e.g., a short-range wireless communication unit) 3510 may include, but are not limited to, a Bluetooth communicator, a BLE communicator, a near-field communicator, a WLAN communicator, a ZigBee communicator, a IrDA communicator, a WFD communicator, a UWB communicator, and a Ant+ communicator.

The mobile communicator 3520 transmits/receives a wireless signal to/from at least one from among a base station, an external terminal 1000, and a server through a mobile communication network. The wireless signal may include a voice call signal, a video call signal, or various types of data according text/multimedia message transmission/reception.

The broadcast receiver 3530 receives information related to broadcast and/or a broadcast signal from an external source through a broadcast channel. Examples of the broadcast channel may include a satellite channel and a terrestrial wave channel. According to an embodiment, the terminal 1000 may not include the broadcast receiver 3530.

An audio/video (A/V) input unit 3600 for inputting an audio signal or a video signal may include a camera 3610 and a microphone 3620. The camera 3610 may obtain an image frame such as a still image or a moving image through an image sensor in a video call mode or an imaging mode. An image captured through the image sensor may be processed by the controller 3300 or an additional image processor (not shown).

The image frame processed by the camera 3610 may be stored in the memory 3700 or may be transmitted to the outside through the communicator 3500. Two or more cameras 3610 may be provided according to a specification of the terminal 1000.

The microphone 3620 receives an external sound signal and processes the external sound signal as electrical voice data. For example, the microphone 3620 may receive a sound signal from an external device or a speaker. The microphone 3620 may use any of various noise removal algorithms for removing noise generated in a process of receiving the external sound signal.

The memory 3700 may store a program for processing and controlling the controller 3300, and may store data input to the terminal 1000 or output from the terminal 1000.

The memory 3700 may include at least one type of storage medium from among a flash memory type memory, a hard disk type memory, a multimedia card micro type memory, a card type memory (e.g., an SD or XD memory), a RAM, a SRAM, a ROM, an EEPROM, a PROM, a magnetic memory, a magnetic disk, and an optical disk.

Programs stored in the memory 3700 may be classified into a plurality of modules according to functions. For example, the programs may be classified into a touchscreen module 3710, a user interface (UI) module 3720, and a notification module 3730.

In relation to the touchscreen module 3710, any of various sensors may be provided inside or near the touchscreen 3210 in order to detect a touch or a proximate touch of the touchscreen 3210. Examples of a touch gesture of the user may include a tap, a touch and hold, a double tap, a drag, a panning, a flick, a drag and drop, and a swipe.

The UI module 3720 may provide a specialized UI that interoperates with the terminal 1000 according to each application and a graphic user interface (GUI). The touchscreen module 3710 may detect the user's touch gesture on the touchscreen 3210 and may transmit information about the touch gesture to the controller 3300. The touchscreen module 3710 according to an embodiment may recognize and analyze a touch code. The touchscreen module 3710 may be implemented as separate hardware including a controller.

The notification module 3730 may generate a signal for notifying an event of the terminal 1000. Examples of the event occurring in the terminal 1000 may include call signal reception, message reception, message generation, key signal input, and schedule notification. The notification module 3730 may output a notification signal as a video signal through the touchscreen 3210, may output a notification signal as an audio signal through the sound output unit 3220, and may output a notification signal as a vibration signal through the vibration motor 3230.

The above-described device may be realized in the form of a hardware component, a software component, and/or a combination of a hardware component and a software component. For example, the device and corresponding components according to the above-described embodiments may be realized by using one or more universal computers or special-purpose computers such as a processor, a controller, an arithmetic logic unit (ALU), a digital signal processor, a microcomputer, a field programmable array (FPA), a programmable logic unit (PLU), a microprocessor, or any type of device that may execute and respond to an instruction (or command).

A processing device may execute an operating system (OS) and at least one software application, which is executed within the OS. Additionally, the processing device may respond to the execution of a software application, so as to access, store, manipulate, process, and generate data.

In order to facilitate and simplify the understanding of the present invention, the present invention may be described to include only one processing device. However, it will be apparent to one of ordinary skill in the art that the processing device may include a plurality of processing elements and/or may include multiple types of processing elements. For example, the processing device may include multiple processors, or the processing device may include one processor and one controller. Additionally, other processing configuration, such as a parallel processor, may be possible.

The software may include a computer program, a code, an instruction, or a combination of one or more of the above. And, the software may configure a processing device, so that the processing device may be operated as intended, or the software may independently or collectively instruct (or command) the processing device.

In order to be interpreted by the processing device, or in order to provide an instruction or data to the processing device, the software and/or data may be permanently or temporarily embodied in any type of machine, a component, a physical equipment (or device), virtual equipment, a computer storage medium or device, or a transmitted signal wave. Since the software is dispersed (or scattered) within a computer system being connected to a network, the software may be stored or executed by using a dispersion method. The software and data may be stored in one or more computer-readable recording media.

The method according to the one or more embodiments may be realized in a program command (or instruction) format that may be executed by using diverse computing means, so as to be recorded in a computer-readable medium. Herein, the computer-readable medium may independently include a program command (or instruction), a data file, a data structure, and so on, or may include a combination of the same. The program command being recorded in the computer-readable medium may correspond to a program command that is specifically designed and configured for the one or more embodiments, or the program command may correspond to a program command that is disclosed and available to anyone skilled in or related to computer software.

Examples of the computer-readable recording medium may include magnetic media such as hard discs, floppy discs, and magnetic tapes, optical media such as CD-ROMs and DVDs, magneto-optical media such as floptical discs, and hardware devices specially configured (or designed) for storing and executing program commands such as ROMs, RAMs, and flash memories.

Examples of the program command may not only include machine language codes, which are created by a compiler, but may also include high-level language codes, which may be executed by a computer by using an interpreter, and so on.

The above-mentioned hardware equipment may be configured to be operated as one or more software modules for executing the operations of the one or more embodiments, and vice versa.

It will be understood by one of ordinary skill in the art that while the present invention has been particularly shown and described with reference to embodiments thereof and drawings, various modifications and variations may be without departing from the spirit or scope of the present invention. For example, the above-described techniques may be executed in an order different from that described in the description of the present invention, and/or the components of the above-described system, structure, equipment (or device), circuit, and so on, may be combined in a format different that of the above-described method according to the present invention, and an adequate result may be achieved even if the above-described components of the present invention are replaced by any other component or its equivalent.

Thus, the scope of the present invention is not limited to the one or ore embodiments and is defined by the appended claims and their equivalents.

The invention claimed is:

1. An operation method of a terminal, the operation method comprising:
    executing a voice call service between the terminal and at least one terminal;
    determining at least one short-range terminal existing within a preset range from among the at least one terminal, based on location information of the terminal;
    detecting a howling frequency band in which howling occurs between the terminal and the at least one short-range terminal from among a plurality of frequency bands in which the voice call service is performed, based on information of the plurality of frequency bands; and
    removing the howling by adjusting a gain of the howling frequency band.

2. The operation method of claim 1, wherein the information of the plurality of frequency bands comprises at least one from among a peak value and an energy value of each of the plurality of frequency bands.

3. The operation method of claim 2, wherein the detecting of the howling frequency band in which the howling occurs between the terminal and the at least one short-range terminal from among the plurality of frequency bands in which the voice call service is performed, based on the information of the plurality of frequency bands comprises:
    obtaining an energy change rate of each of the plurality of frequency bands based on input voice information of the at least one short-range terminal and output voice information of the terminal; and
    detecting the howling frequency band, based on the energy change rate of each of the plurality of frequency bands.

4. The operation method of claim 3, wherein the detecting of the howling frequency based, based on the energy change rate of each of the plurality of frequency bands comprises, when an energy change rate of a predetermined frequency band from among the plurality of frequency bands exceeds a preset change rate, detecting the predetermined frequency band as the howling frequency band.

5. The operation method of claim 3, further comprising obtaining voice loop cycle information of the voice call service,
    wherein the detecting of the howling frequency band, based on the energy change rate of each of the plurality of frequency bands comprises detecting a predetermined frequency band whose energy change rate is periodically changed according to the voice loop cycle information from among the plurality of frequency bands as the howling frequency band, based on the voice loop cycle information.

6. The operation method of claim 1, wherein the removing of the howling by adjusting the gain of the howling frequency band comprises adjusting the gain of the howling frequency band, based on at least one from among the information of the plurality of frequency bands, voice loop cycle information of the voice call service, a distance between the terminal and the at least one short-range terminal, and a number of the at least one short-range terminal.

7. The operation method of claim 6, wherein the adjusting of the gain of the howling frequency band, based on the distance between the terminal and the at least one short-range terminal comprises:
    determining a filter coefficient so that the gain of the howling frequency band decreases as the distance between the terminal and the at least one short-range terminal decreases; and
    determining the filter coefficient so that the gain of the howling frequency band increases as the distance between the terminal and the at least one short-range terminal increases.

8. The operation method of claim 1, further comprising sharing, with the at least one short-range terminal, at least one from among the information of the plurality of frequency bands, a distance between the terminal and the at least one short-range terminal, voice call delay time information of the voice call service, and volume information of the terminal.

9. The operation method of claim 8, wherein the voice call delay time information is obtained based on a voice delay by the terminal and a network formed between the terminal and the at least one short-range terminal.

10. The operation method of claim 1, wherein the removing of the howling by adjusting the gain of the howling frequency band in which the howling occurs is performed by a notch filter of the terminal.

11. A terminal comprising:
    a controller configured to execute a voice call service between the terminal and at least one terminal, determine at least one short-range terminal existing within a preset range from among the at least one terminal, based on location information of the terminal, detect a howling frequency band in which howling occurs between the terminal and the at least one short-range terminal from among a plurality of frequency bands in which the voice call service is performed, based on information of the plurality of frequency bands, and remove the howling by adjusting a gain of the howling frequency band; and
    an output unit configured to output a voice from which the howling is removed.

12. The terminal of claim 11, wherein the information of the plurality of frequency bands comprises at least one from among a peak value and an energy value of each of the plurality of frequency bands,
    wherein the controller is further configured to obtain an energy change rate of each of the plurality of frequency bands based on input voice information of the at least one short-range terminal and output voice information of the terminal, and detect the howling frequency band, based on the energy change rate of each of the plurality of frequency bands.

13. The terminal of claim 12, wherein the controller is further configured to, when an energy change rate of a predetermined frequency band from among the plurality of frequency bands exceeds a preset change rate, detect the predetermined frequency band as the howling frequency band.

14. The terminal of claim 12, wherein the controller is further configured to obtain voice loop cycle information of the voice call service, and detect a predetermined frequency band whose energy change rate is periodically changed according to the voice loop cycle information from among the plurality of frequency bands as the howling frequency band, based on the voice loop cycle information.

15. The terminal of claim 11, wherein the controller is further configured to adjust the gain of the howling frequency band in which the howling occurs, based on at least one from among the information of the plurality of frequency bands, voice loop cycle information of the voice call service, a distance between the terminal and the at least one short-range terminal, and a number of the at least one short-range terminal.

* * * * *